United States Patent
Mo et al.

(10) Patent No.: US 9,747,489 B2
(45) Date of Patent: Aug. 29, 2017

(54) ELECTRIC FIELD-TYPE FINGERPRINT IDENTIFICATION APPARATUS AND STATE CONTROL METHOD AND PROSTHESIS IDENTIFICATION METHOD THEREOF

(71) Applicant: FOCALTECH ELECTRONICS, LTD., Cayman Islands (KY)

(72) Inventors: Lianghua Mo, Guangdong (CN); Haijun Hu, Guangdong (CN)

( * ) Notice: Subject to any disclaimer, the term of this patent is extended or adjusted under 35 U.S.C. 154(b) by 0 days.

(21) Appl. No.: 15/110,798

(22) PCT Filed: Jan. 14, 2014

(86) PCT No.: PCT/CN2014/070614
§ 371 (c)(1),
(2) Date: Jul. 11, 2016

(87) PCT Pub. No.: WO2015/106391
PCT Pub. Date: Jul. 23, 2015

(65) Prior Publication Data
US 2016/0379032 A1    Dec. 29, 2016

(51) Int. Cl.
*G06K 9/00*    (2006.01)
(52) U.S. Cl.
CPC ....... *G06K 9/0002* (2013.01); *G06K 9/00107* (2013.01)
(58) Field of Classification Search
CPC .................. G06K 9/0002; G06K 9/00107
USPC .......... 382/115–124; 356/71; 340/5.52, 5.53, 340/5.82, 5.83; 902/3, 6; 396/15;
(Continued)

(56) References Cited

U.S. PATENT DOCUMENTS 6,049,620 A * 4/2000 Dickinson .............. G01B 7/004
382/108
6,636,053 B1 * 10/2003 Gozzini .................. G01D 5/24
324/658
(Continued)

FOREIGN PATENT DOCUMENTS

| CN | 101727571 A | 6/2010 |
| CN | 202771445 U | 3/2013 |
| CN | 103376970 A | 10/2013 |

OTHER PUBLICATIONS

International Search Report for PCT/CN2014/070614, dated Oct. 24, 2014, ISA/CN.

*Primary Examiner* — Samir Ahmed
(74) *Attorney, Agent, or Firm* — Yue Xu; U.S. Fairsky LLP

(57) ABSTRACT

Provided are an electric field type fingerprint identification apparatus and a state control method and a prosthesis identification method. The electric field type fingerprint identification apparatus includes a signal acquisition module and a signal processing module. In a case that a measuring state signal processing unit is electrically connected to a signal acquisition unit, a to-be-measured state signal processing unit is at least electrically connected to at least one signal acquisition unit peripheral to the signal acquisition unit in a measuring state. Charging and discharging processes of sensing capacitors electrically connected to the measuring state signal processing unit and the to-be-measured state signal processing unit are coordinated to restrain charging and discharging quantities of a parasitic capacitor between the signal acquisition unit in the measuring state and the signal acquisition unit in a to-be-measured state.

32 Claims, 10 Drawing Sheets

(58) Field of Classification Search
USPC .................. 283/68, 78; 379/93.03; 434/155; 713/186; 726/5
See application file for complete search history.

(56) References Cited

U.S. PATENT DOCUMENTS

| | | | |
|---|---|---|---|
| 6,714,666 B1* | 3/2004 | Morimura | G06K 9/0002 340/5.52 |
| 6,828,805 B2* | 12/2004 | Izumi | H01L 27/12 257/E27.111 |
| 7,099,497 B2* | 8/2006 | Chou | G06K 9/0002 382/124 |
| 8,005,276 B2* | 8/2011 | Dean | G06K 9/00013 382/124 |
| 2001/0022337 A1* | 9/2001 | Basse | G06K 9/0002 250/208.1 |
| 2002/0125437 A1* | 9/2002 | Izumi | H01L 27/12 250/370.01 |
| 2003/0190061 A1* | 10/2003 | Chou | G06K 9/0002 382/124 |
| 2008/0069413 A1* | 3/2008 | Riedijk | G06K 9/0002 382/124 |
| 2009/0252386 A1 | 10/2009 | Dean | |
| 2014/0218339 A1 | 8/2014 | Hotelling et al. | |

\* cited by examiner

ELECTRIC FIELD-TYPE FINGERPRINT IDENTIFICATION APPARATUS AND STATE CONTROL METHOD AND PROSTHESIS IDENTIFICATION METHOD THEREOF

CROSS-REFERENCE TO RELATED APPLICATION

The present application is a National Stage application of PCT international application No. PCT/CN2014/070614, filed on Jan. 14, 2014, the entire of which is incorporated herein by reference.

FIELD

The disclosure relates to a fingerprint identification apparatus and a data processing method applied in the fingerprint identification apparatus, and in particular to an electric field type fingerprint identification apparatus and a data processing method applied in the electric field type fingerprint identification apparatus.

BACKGROUND

As shown in FIG. 13, an electric field type fingerprint identification apparatus according to the conventional technology includes at least one fingerprint identification basic unit. The fingerprint identification basic unit includes an electrode plate 71, a first transistor 72 serving as a controlled switching device, a second transistor 73 serving as another controlled switching device and an electric charge amplifier 74. During fingerprint identification, the first transistor 72 is firstly switched on to charge the electrode plate 71 and reset the electric charge amplifier 74. Then, the first transistor 72 is switched off and the second transistor 73 is switched on to transfer an electric charge on the electrode plate 71 to an output end of the electric charge amplifier 74. In this way, a feature image of a fingerprint is determined based on different change quantities of the electric charge. The electric field type fingerprint identification apparatus according to the conventional technology has the following defects and disadvantages.

1. Two transistors serving as the controlled switching devices are adopted to achieve a basic fingerprint identification function, hence a structure of the fingerprint identification basic unit is complicated and a device cost is high.

2. Diverse design solutions can not be obtained based on an application requirement, due to a single form of the circuit.

3. Mutual interference exist between electric fields of fingerprint identification basic units. Parasitic capacitors exist between the fingerprint identification basic units. During charging and discharging the electrode plate, the quantity of the electric charge may be changed by the parasitic capacitors. And since the change quantity of the electric charge caused by the parasitic capacitors is unmeasurable, the mutual interference exist between the electric fields of the respective fingerprint identification basic units, thereby affecting accurate measurement of the change quantity of the electric charge and thus affecting a result and accuracy of the fingerprint identification.

4. A fingerprint of a prosthesis finger can not be determined and distinguished by the fingerprint identification apparatus according to the conventional technology.

SUMMARY

An technical issue to be addressed in the present disclosure is to avoid the disadvantages of the conventional technology and to provide a simplified basic unit effectively preventing mutual interference between the basic units, an electric field type fingerprint identification apparatus applicable to multiple application requirements and a method for identifying a fingerprint of a prosthesis finger applied in the electric field type fingerprint identification apparatus.

In the present disclosure, the technical issue may be addressed with the following technical solutions.

An electric field type fingerprint identification apparatus is designed and fabricated. The electric field type fingerprint identification apparatus includes a signal acquisition module and a signal processing module. Particularly, the signal acquisition module includes at least two signal acquisition units, all of the signal acquisition units fill up an entire finger touch region and form a signal acquisition unit array. Each of the signal acquisition units includes a sensing capacitor. The signal processing module includes a measuring state signal processing unit and a to-be-measured state signal processing unit, the measuring state signal processing unit is configured to acquire capacitance change quantities respectively caused by convex and concave textures of fingerprints from the signal acquisition unit by charging and discharging the sensing capacitor, the to-be-measured state signal processing unit is configured to only charge and discharge sensing capacitor of the signal acquisition unit. The measuring state signal processing unit and the to-be measured state signal processing unit are electrically connected to the signal acquisition units controlledly. In a case that the measuring state signal processing unit is electrically connected to at least one of the signal acquisition units and makes the at least one of the signal acquisition units be in a measuring state, the to-be-measured state signal processing unit is at least electrically connected to at least one of the signal acquisition units at the periphery of the signal acquisition unit in the measuring state and makes the at least one of the signal acquisition units be in a to-be-measured state. Charging and discharging quantities of a parasitic capacitor between the signal acquisition unit in the measuring state and the signal acquisition unit in the to-be-measured state are restrained by controlling the measuring state signal processing unit and the to-be-measured state signal processing unit to coordinate charging and discharging processes of the sensing capacitors electrically connected to the measuring state signal processing unit and the to-be-measured state signal processing unit.

Specifically, the signal acquisition unit array may be covered by a dielectric layer which is configured to be touched by a finger.

For a chip design solution, the signal acquisition module and the signal processing module may be arranged in a same integrated circuit chip. Alternatively, the signal acquisition module may be arranged in a first integrated circuit chip and the signal processing module may be arranged in a second integrated circuit chip. And the first integrated circuit chip arranged with the signal acquisition module may be made by a Thin Film Transistor fabrication process.

A solution for the two state signal processing units is as follows. The measuring state signal processing unit may include at least one acquisition processing sub-unit and at least one acquisition driving sub-unit, the acquisition processing sub-unit may be configured to detect the capacitance change quantity of a branch where the sensing capacitor is located, and the acquisition driving sub-unit may be configured to control the sensing capacitor to be electrically connected to the acquisition processing sub-unit or electrically disconnected from the acquisition processing sub-unit. The to-be-measured state signal processing unit may include at least one electric potential servo sub-unit and at least one to-be-measured driving sub-unit, the electric potential servo sub-unit may be configured to charge and discharge a branch where the sensing capacitor is located, and the to-be-measured driving sub-unit may be configured to control the sensing capacitor to be electrically connected to the electric potential servo sub-unit or electrically disconnected from the electric potential servo sub-unit. For the signal acquisition unit needing to operate in the measuring state, the acquisition driving sub-unit may control the sensing capacitor of the signal acquisition unit to be electrically connected to the acquisition processing sub-unit, and the acquisition processing sub-unit may detect the capacitance change quantities respectively caused by convex and concave textures of fingerprints in an electric field region formed by the sensing capacitor. For the signal acquisition unit needing to operate in the to-be-measured state, the to-be-measured driving sub-unit may control the sensing capacitor to be electrically connected to the electric potential servo sub-unit, and an electric potential change of the sensing capacitor of the signal acquisition unit in the to-be-measured state may change with an electric potential change of the sensing capacitor of the signal acquisition unit in the measuring state.

In order to achieve the acquisition driving sub-unit controlling the sensing capacitor to be electrically connected to the acquisition processing sub-unit or electrically disconnected from the acquisition processing sub-unit, the signal acquisition unit may further include a controlled acquisition switching sub-unit. An input end of the controlled acquisition switching sub-unit may be electrically connected to one end of the sensing capacitor, and the other end of the sensing capacitor may be grounded. An output end of the controlled acquisition switching sub-unit may output a signal to the acquisition processing sub-unit, and a controlled end of the controlled acquisition switching sub-unit may be electrically connected to the acquisition driving sub-unit.

Specifically, the controlled acquisition switching sub-unit may be an insulated gate field effect transistor. A gate electrode of the insulated gate field effect transistor may serve as the controlled end of the controlled acquisition switching sub-unit. One of a drain electrode of the insulated gate field effect transistor and a source electrode of the insulated gate field effect transistor may serve as the input end of the controlled acquisition switching sub-unit. And the other one of the drain electrode of the insulated gate field effect transistor and the source electrode of the insulated gate field effect transistor may serve as the output end of the controlled acquisition switching sub-unit.

In order to achieve the to-be-measured driving sub-unit controlling the sensing capacitor to be electrically connected to the electric potential servo sub-unit or electrically disconnected from the electric potential servo sub-unit, the signal acquisition unit may further include a controlled to-be-measured switching sub-unit. An output end of the controlled to-be-measured switching sub-unit may be electrically connected to one end of the sensing capacitor, and the other end of the sensing capacitor may be grounded. An input end of the controlled to-be-measured switching sub-unit may receive a voltage signal outputted from the electric potential servo sub-unit. And a controlled end of the controlled to-be-measured switching sub-unit may be electrically connected to the to-be-measured driving sub-unit.

Similarly, the controlled to-be-measured switching sub-unit may be an insulated gate field effect transistor. A gate electrode of the insulated gate field effect transistor may serve as the controlled end of the controlled to-be-measured switching sub-unit. One of a drain electrode of the insulated gate field effect transistor and a source electrode of the insulated gate field effect transistor may serve as the input end of the controlled to-be-measured switching sub-unit, and the other one of the drain electrode of the insulated gate field effect transistor and the source electrode of the insulated gate field effect transistor may serve as the output end of the controlled to-be-measured switching sub-unit.

Specifically, the acquisition processing sub-unit may include an operational amplifier, a feedback capacitor and an analog switching circuit sub-unit. An output end of the analog switching circuit sub-unit may be electrically connected to an inverting input end of the operational amplifier, two ends of the feedback capacitor may be electrically connected to the inverting input end and an output end of the operational amplifier respectively, and a reference voltage may be inputted to a non-inverting input end of the operational amplifier. An input end of the analog switching circuit sub-unit may receive an output signal from the signal acquisition unit, and the output end of the operational amplifier may output a quantized signal of the capacitance change quantities respectively caused by convex and concave textures of fingerprints in an electric field region formed by the sensing capacitor of the signal acquisition unit.

In the present disclosure, the technical issue may be addressed with the following technical solutions.

A state control method in signal acquisition applied in the above electric field type fingerprint identification apparatus is provided in the present disclosure. The method includes the following steps:

A. in a case that the measuring state signal processing unit is electrically connected to at least one of the signal acquisition units and makes the at least one of the signal acquisition units be in the measuring state, at least electrically connecting the to-be-measured state signal processing unit to at least one of the signal acquisition units at the periphery of the signal acquisition unit in the measuring state and making the signal acquisition unit electrically connected to the to-be-measured state signal processing unit be in the to-be-measured state; and B. controlling charging and discharging processes of the sensing capacitor of the signal acquisition unit in the measuring state and controlling charging and discharging processes of the sensing capacitor of the signal acquisition unit in the to-be-measured state, to synchronize the charging and discharging processes of the sensing capacitor of the signal acquisition unit in the measuring state and the charging and discharging processes of the sensing capacitor of the signal acquisition unit in the to-be-measured state based on signals from branches where the sensing capacitors are located, to restrain the charging and discharging quantities of the parasitic capacitor between the sensing capacitor of the signal acquisition unit in the measuring state and the sensing capacitor of the signal acquisition unit in the to-be-measured state.

Specifically, the signal from the branch where the sensing capacitor is located according to step B may refer to at least one of frequency, voltage amplitude, current amplitude, phase and electric charge on the branch where the sensing capacitor is located.

In the present disclosure, the technical issue may be addressed with the following technical solutions.

It is provided a method for identifying a fingerprint of a prosthesis finger, applied in the electric field type fingerprint identification apparatus based on a self-capacitance principle. The method includes the following steps:

A. providing an impedance change threshold and completing step B to step E before performing fingerprint identification;
B. detecting an impedance change value of a detected finger with different scan frequencies in a descending order or an ascending order of the scan frequencies;
C. comparing the impedance change value detected in step B with the impedance change threshold;
if the impedance change value detected in step B is not less than the impedance change threshold, performing step D;
if the impedance change value detected in step B is less than the impedance change threshold, performing step E;
D. determining that the detected finger is a real finger and starting to perform the fingerprint identification; or
E. determining that the detected finger is a prosthesis finger and terminating the fingerprint identification.

Compared with the conventional technology, technical effects of the present disclosure "ELECTRIC FIELD-TYPE FINGERPRINT IDENTIFICATION APPARATUS AND STATE CONTROL METHOD AND PROSTHESIS IDENTIFICATION METHOD THEREOF" includes the following.

1. The structure of the signal acquisition unit according to the present disclosure is simple, thereby saving a device cost.

2. In the present disclosure, the measuring state signal processing unit and the to-be-measured state signal processing unit coordinate and control charging and discharging states of the sensing capacitors and eliminate an electric potential difference of a parasitic capacitor between the sensing capacitors, thereby reducing and even eliminating an effect on a capacitance change quantity of a branch, where the sensing capacitor is located, caused by the parasitic capacitor between the sensing capacitors in the entire apparatus. Therefore, it is ensured that the signal acquisition unit not operating in the measuring state does not affect the signal acquisition unit operating in the measuring state, hence avoiding mutual interference between the signal acquisition units.

3. The modules and the units may be connected in multiple manners in the disclosure, hence the fingerprint identification apparatus according to the present disclosure can be adapted to multiple application requirements.

4. In the present disclosure, a fingerprint of a prosthesis finger can be determined, thereby improving security and reliability of the fingerprint identification apparatus.

DETAILED DESCRIPTION OF EMBODIMENTS

Figure 1:
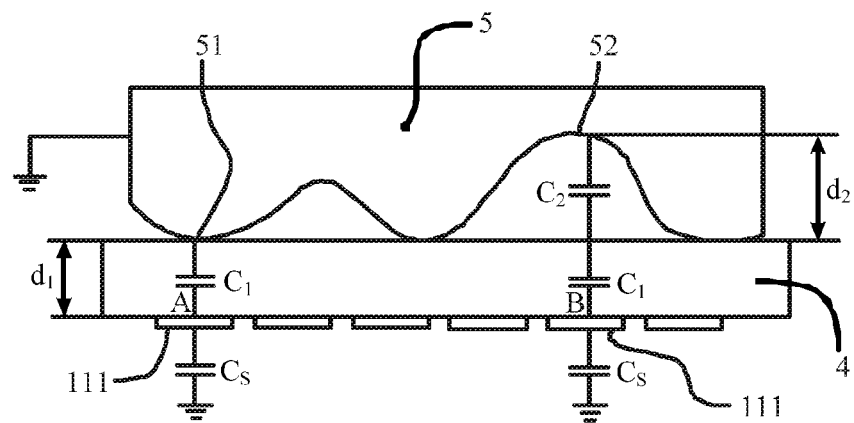
FIG. 1 is a schematic diagram of a principle of fingerprint identification according to the present disclosure, i.e. "ELECTRIC FIELD-TYPE FINGERPRINT IDENTIFICATION APPARATUS AND STATE CONTROL METHOD AND PROSTHESIS IDENTIFICATION METHOD THEREOF"

Technical solutions are described in detail in conjunction with embodiments shown in the drawings.

A principle of fingerprint identification according to the present disclosure is shown in FIG. 1. A finger 5 includes a fingerprint convex region 51 and a fingerprint concave region 52. A capacitive sensing module of a fingerprint identification apparatus includes at least one upper electrode plate 111, and an insulated protective layer 4 covering on the at least one upper electrode plate 111. A base capacitor $C_S$ is formed between the upper electrode plate 111 and the ground. In a case that the finger 5 touches on the capacitive sensing module, capacitance between the ground and each of the upper electrode plates 111 in a capacitor array of the capacitive sensing module may be changed.

Before touching, capacitance at A is: $C_{A0}=C_S$.
After the touching, the capacitance at A is: $C_{A1}=C_S+C_1$, where $$C_1 = \frac{\varepsilon_1 A}{d_1}.$$

And a capacitance change quantity at A between the capacitance at A before the touching and the capacitance at A after the touching is: $C_{AA}=C_1$.

Before the touching, capacitance at B is: $C_{B0}=C_S$.
After the touching, the capacitance at B is:

$$C_{B1} = C_S + \frac{C_1 \cdot C_2}{C_1 + C_2}, \text{ where } C_1 = \frac{\varepsilon_1 A}{d_1} \text{ and } C_2 = \frac{\varepsilon_2 A}{d_2}.$$

And a capacitance change quantity at B between the capacitance at B before the touching and the capacitance at B after the touching is:

$$C_{\Delta B} = \frac{C_1 \cdot C_2}{C_1 + C_2}.$$

It can be seen from the above calculation and analysis that, capacitance change quantities at points corresponding to a convex portion and a concave portion of the fingerprint may be different. Therefore, the capacitance change quantity represents convex-concave information of the fingerprint, thereby obtaining convex-concave feature information of the fingerprint.

In the present disclosure, two or more signal acquisition units are arranged in a finger touch region. With the above basic principle of fingerprint information acquisition, each of the signal acquisition units acquires a capacitance change quantity caused by a finger touch via a sensing capacitor of the signal acquisition unit. And complete fingerprint information may be acquired by combining capacitance change quantities acquired by all of the signal acquisition units. Parasitic capacitors exist between the sensing capacitors of the signal acquisition units since multiple sensing capacitors are arranged in a small area. In the conventional technology, electric potential differences are formed on the parasitic capacitors between the sensing capacitors regardless of an adopted driving method, since it is difficult to keep consistent between charging and discharging processes of the sensing capacitors of the signal acquisition units. And the electric potential differences may cause charging and discharging quantities of the parasitic capacitors, thereby affecting accuracy of measurement of a capacitance change quantity and change quantity of the electric charge of a branch where the sensing capacitor measuring capacitance change quantities respectively caused by convex and concave textures of a fingerprint is located, and thus affecting accuracy of acquiring information of the fingerprint. The present disclosure tries to overcome the above effects caused by the parasitic capacitors between the sensing capacitors.

The present disclosure provides an electric field type fingerprint identification apparatus as shown in FIG. 2 to FIG. 5. The electric field type fingerprint identification apparatus includes a signal acquisition module 1 and a signal processing module 2. The signal acquisition module 1 includes at least two signal acquisition units 10, and all of the signal acquisition units fill up an entire finger touch region 9 and form a signal acquisition unit array. Each of the signal acquisition units 10 includes a sensing capacitor. The signal processing module 2 includes a measuring state signal processing unit 21 and a to-be-measured state signal processing unit 22. The measuring state signal processing unit 21 is configured to acquire capacitance change quantities respectively caused by convex and concave textures of fingerprints from the signal acquisition unit by charging and discharging the sensing capacitor. And the to-be-measured state signal processing unit 22 is configured to only charge and discharge the sensing capacitor of the signal acquisition unit. The measuring state signal processing unit 21 and the to-be-measured state signal processing unit 22 are electrically connected to the signal acquisition units 10 controlledly. In a case that the measuring state signal processing unit 21 is electrically connected to at least one of the signal acquisition units 10 and makes the at least one of the signal acquisition units 10 be in a measuring state, the to-be-measured state signal processing unit 22 is at least electrically connected to at least one of the signal acquisition units 10 at the periphery of the signal acquisition unit 10 in the measuring state and makes the at least one of the signal acquisition units 10 be in a to-be-measured state. Charging and discharging quantities of a parasitic capacitor between the signal acquisition unit 21 in the measuring state and the signal acquisition unit 22 in the to-be-measured state are restrained, by controlling the measuring state signal processing unit 21 and the to-be-measured state signal processing unit 22 to coordinate charging and discharging processes of the sensing capacitors electrically connected to the measuring state signal processing unit 21 and the to-be-measured state signal processing unit 22.

As described in the above, in the case that the measuring state signal processing unit 21 is electrically connected to at least one of the signal acquisition units 10 and makes the at least one of the signal acquisition units 10 be in the measuring state, the to-be-measured state signal processing unit 22 is "at least" electrically connected to "at least" one of the signal acquisition units 10 at the periphery of the signal acquisition unit 10 in the measuring state and makes the at least one of the signal acquisition units 10 be in the to-be-measured state. Two "at least" for the to-be-measured state signal processing unit 22 includes multiple cases, and meanings of the two "at least" here are described non-exhaustively in conjunction with the drawings.

Figure 2:
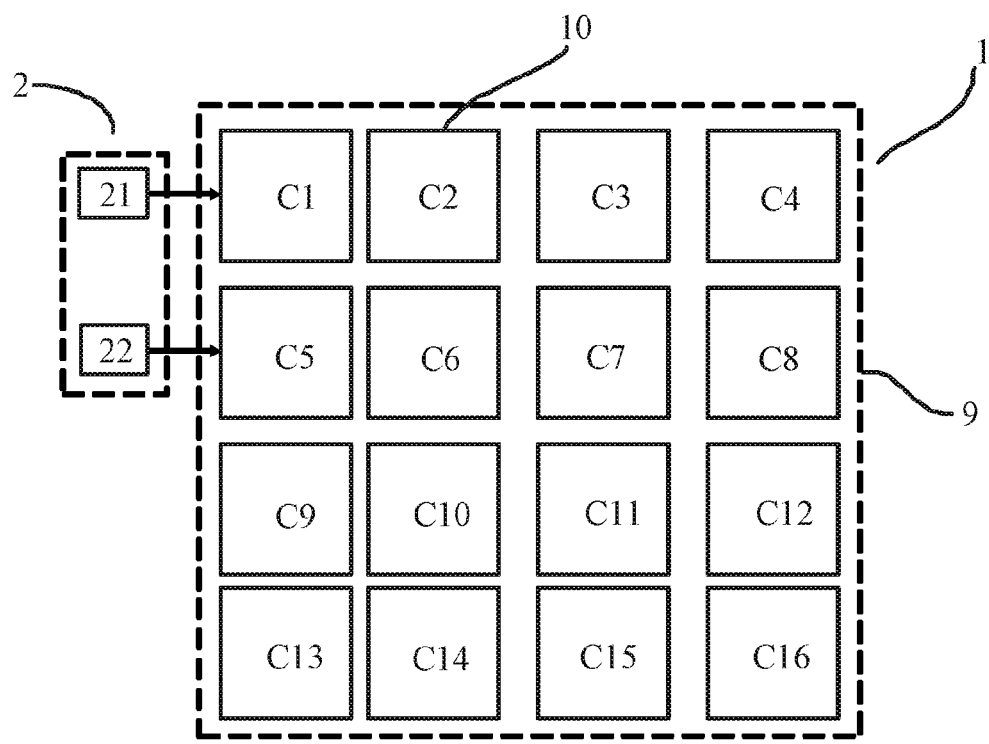
FIG. 2 is a first schematic block diagram of an electrical principle of an electric field type fingerprint identification apparatus according to the present disclosure.

A first case is as shown in FIG. 2. The signal acquisition unit array is formed by 16 signal acquisition units 10 numbered from C1 to C16. In a case that the measuring state signal processing unit 21 is electrically connected to the signal acquisition unit 10 numbered C1 and makes the signal acquisition unit 10 numbered C1 be in the measuring state, the signal acquisition units 10 numbered C2, C6 and C5 are closest to the signal acquisition unit 10 numbered C1, and parasitic capacitors existing between the signal acquisition units 10 numbered C2, C6 and C5 and the signal acquisition unit 10 numbered C1 may have a maximum effect on measurement of a capacitance change quantity of the signal acquisition unit 10 numbered C1. The to-be-measured state signal processing unit 22 is electrically connected to only the closest signal acquisition unit numbered C5. This case indicates to select at least one signal acquisition unit from the signal acquisition units located most closely to the signal processing unit in the measuring state and to make the selected signal acquisition unit be in the to-be-measured state. Since charging and discharging processes of the sensing capacitors of the signal acquisition units numbered C1 and C5 are controlled to be coordinated and consistent, no electric potential difference exists on two ends of the parasitic capacitor between the sensing capacitors of the signal acquisition units numbered C1 and C5, thereby eliminating an effect on the capacitance change quantity of the signal acquisition unit numbered C1 by the parasitic capacitor. However, since parasitic capacitors still exist between the signal acquisition unit numbered C1 and all of the signal acquisition units neither operating in the measuring state nor operating in the to-be-measured state including the signal acquisition units 10 numbered C2 and C6, and electric potential differences may exist on these parasitic capacitors. Therefore, in the first case shown in FIG. 2, the effect on the measurement of the capacitance change quantity of the signal acquisition unit in the measuring state by the parasitic capacitor is reduced.

Figure 3:
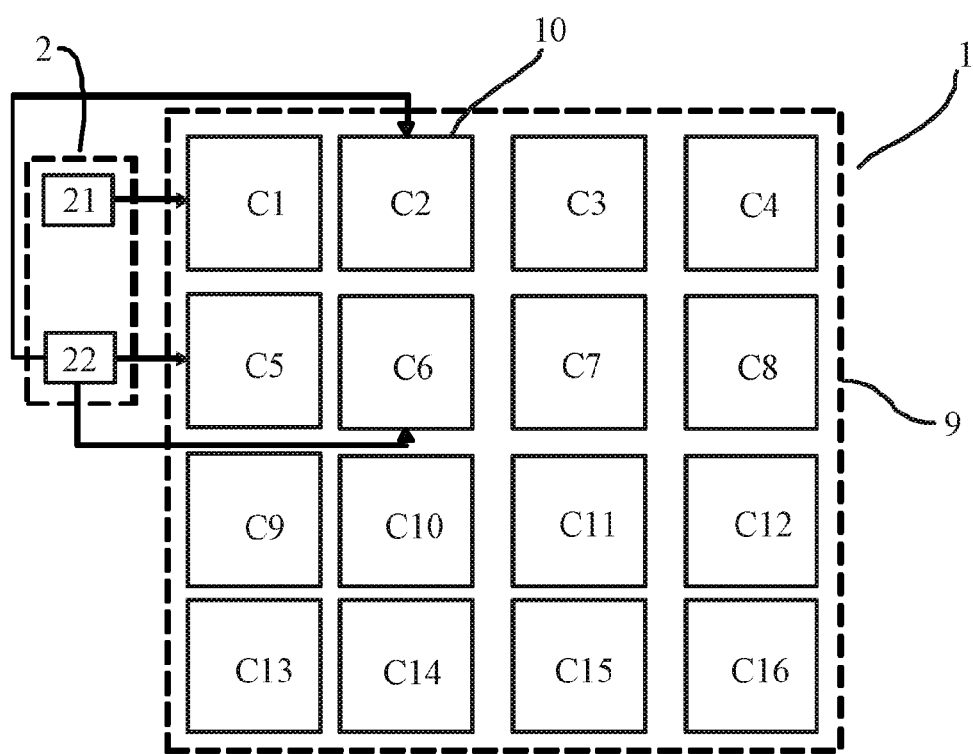
FIG. 3 is a second schematic block diagram of an electrical principle of an electric field type fingerprint identification apparatus according to the present disclosure.

A second case is as shown in FIG. 3. Based on the first case shown in FIG. 2, the to-be-measured state signal processing unit 22 is further electrically connected to the signal acquisition units 10 numbered C2 and C6, located most closely to the signal acquisition unit 10 numbered C1. The parasitic capacitors between the signal acquisition unit 10 numbered C1 and the signal acquisition units 10 numbered C2, C6 and C5 have a maximum effect on the measurement of the capacitance change quantity of the signal acquisition unit 10 numbered C1. This case indicates to select a group of closest signal acquisition units from multiple signal acquisition units at the periphery of the signal acquisition unit in the measuring state and to make the selected signal acquisition units be in the to-be-measured state. Since the charging and discharging processes of the sensing capacitors of the signal acquisition units numbered C1, C2, C5 and C6 are controlled to be coordinated and consistent, no electric potential difference exists on two ends of each of the parasitic capacitors between the sensing capacitors of the signal acquisition units numbered C1, C2, C5 and C6, thereby eliminating the effect on the capacitance change quantity of the signal acquisition unit numbered C1 in the measuring state by the parasitic capacitors. However, since parasitic capacitors still exist between the signal acquisition unit numbered C1 in the measuring state and other signal acquisition units neither operating in the measuring state nor operating in the to-be-measured state, electric potential differences may exist on these parasitic capacitors. Therefore, in the second case shown in FIG. 3, the effect on the measurement of the capacitance change quantity of the signal acquisition unit in the measuring state by the parasitic capacitor is reduced, and the effect reduction degree in the second case shown in FIG. 3 is more than the effect reduction degree in the first case shown in FIG. 2.

Figure 4:
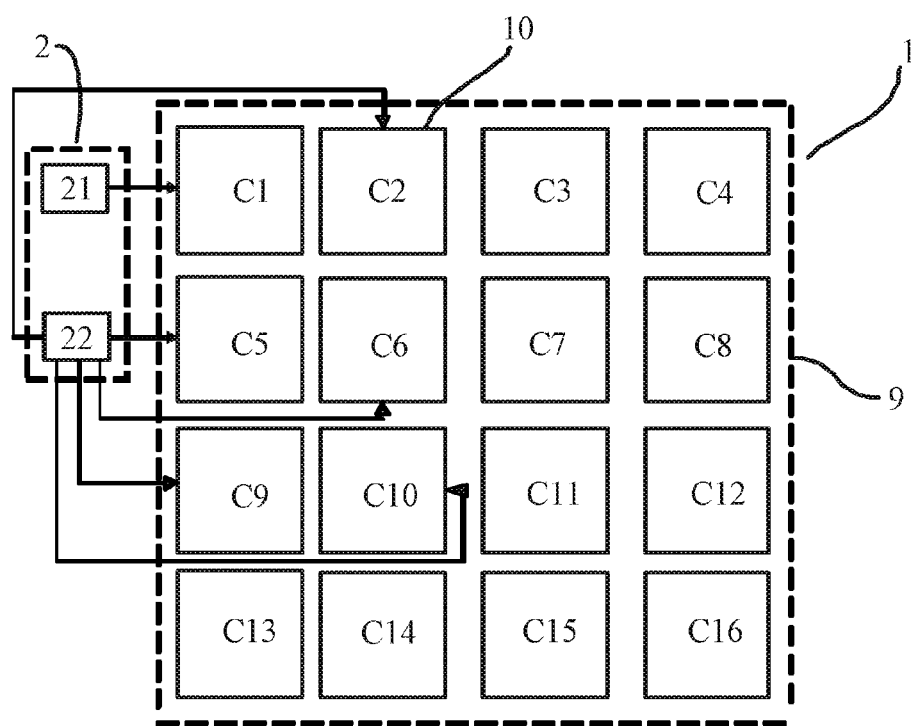
FIG. 4 is a third schematic block diagram of an electrical principle of an electric field type fingerprint identification apparatus according to the present disclosure.

A third case is as shown in FIG. 4. Based on the second case shown in FIG. 3, the signal acquisition units 10 numbered C9 and C10 are further selected from the signal acquisition units 10 numbered C3, C7, C9 to C11 which are slightly away from the signal acquisition unit 10 numbered C1 in the measuring state and are electrically connected to the to-be-measured state signal processing unit 22. This case indicates to select a group of signal acquisition units from multiple signal acquisition units located at the periphery of the signal acquisition unit in the measuring state and to make the selected signal acquisition units be in the to-be-measured state. The selected group of signal acquisition units in the to-be-measured state includes the signal acquisition units located most closely to the signal acquisition unit in the measuring state and the signal acquisition units located slightly away from the signal acquisition unit in the measuring state. Since the charging and discharging processes of the sensing capacitors of the signal acquisition units numbered C1, C2, C5 and C6 are controlled to be coordinated and consistent, no electric potential difference exists on two ends of each of parasitic capacitors between the sensing capacitors of the signal acquisition units numbered C1, C2, C5, C6, C9 and C10, thereby eliminating the effect on the capacitance change quantity of the signal acquisition unit numbered C1 in the measuring state by the parasitic capacitors. However, since parasitic capacitors still exist between the signal acquisition unit numbered C1 in the measuring state and other signal acquisition units neither operating in the measuring state nor operating in the to-be-measured state, electric potential differences may exist on these parasitic capacitors. Therefore, in the third case shown in FIG. 4, the effect on the measurement of the capacitance change quantity of the signal acquisition unit in the measuring state by the parasitic capacitor is reduced, and the effect reduction degree in the third case shown in FIG. 4 is more than the effect reduction degree in the second case shown in FIG. 3.

Figure 5:
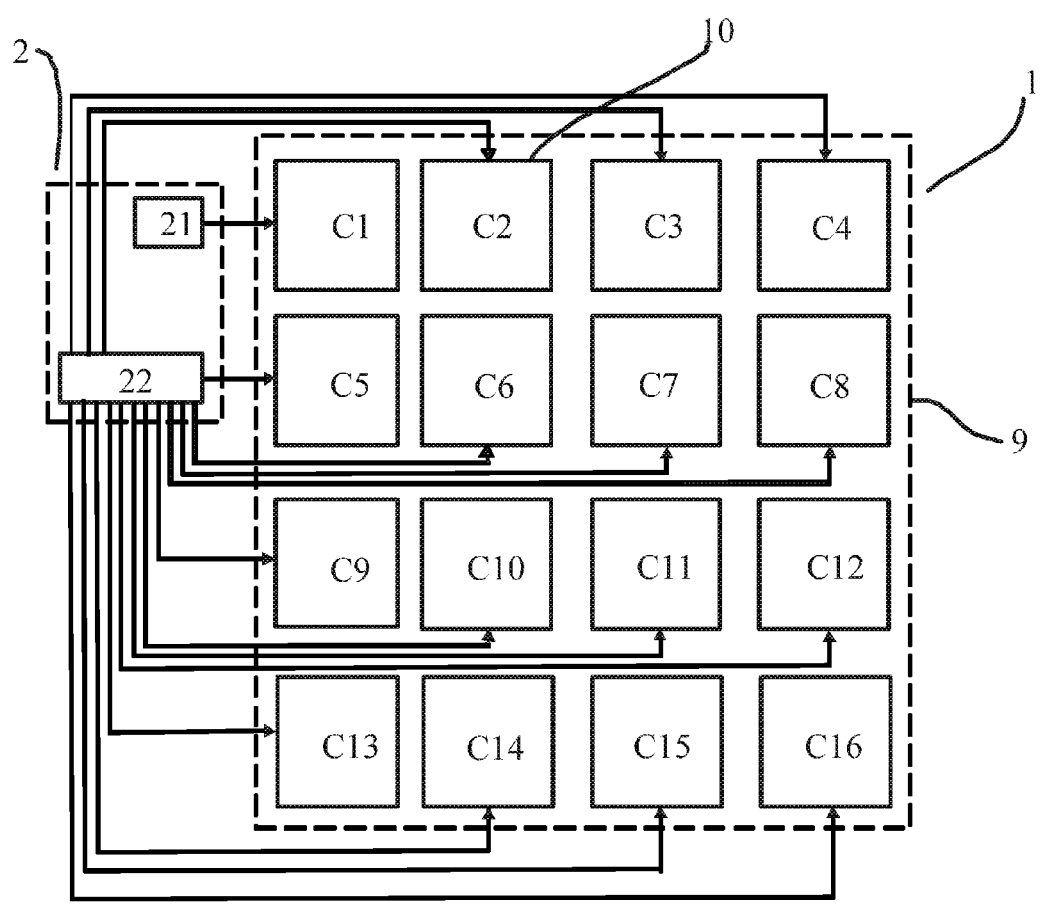
FIG. 5 is a fourth schematic block diagram of an electrical principle of an electric field type fingerprint identification apparatus according to the present disclosure.

A fourth case is as shown in FIG. 5. Except for the signal acquisition unit 10 numbered C1 in the measuring state, all of the signal acquisition units other than the signal acquisition unit 10 numbered C1 are electrically connected to the to-be-measured state signal processing unit 22 and are in the to-be-measured state. This case indicates that all of the signal acquisition units located at the periphery of the signal acquisition unit in the measuring state are in the to-be-measured state. Since charging and discharging processes of sensing capacitors of all of the signal acquisition units are controlled to be coordinated and consistent, no electric potential difference exists on two ends of each of the parasitic capacitors between the sensing capacitors of the signal acquisition units, thereby substantially eliminating the effect on the capacitance change quantity of the signal acquisition unit numbered C1 in the measuring state by the parasitic capacitors. Since no electric potential difference exists on all of the parasitic capacitors related to the signal acquisition unit numbered C1 in the measuring state, in the fourth case shown in FIG. 5, it is eliminated the effect on the measurement of the capacitance change quantity of the signal acquisition unit in the measuring state by the parasitic capacitors.

In summary, at least one of the signal acquisition units other than the signal acquisition unit in the measuring state is electrically connected to the to-be-measured state signal processing unit. With the increasing number of the signal acquisition units in the to-be-measured state and the increasing closeness between the signal acquisition unit in the to-be-measured state and the signal acquisition unit in the measuring state, a charging and discharging quantity of a parasitic capacitor between the signal acquisition unit in the measuring state and the signal acquisition unit in the to-be-measured can be reduced and even eliminated, that is, the effect on the measurement of the capacitance change quantity by the parasitic capacitor is restrained. Therefore, the "restraining" the charging and discharging quantity of the parasitic capacitor between the signal acquisition unit in the measuring state and the signal acquisition unit in the to-be-measured state includes "reducing" or "eliminating" the charging and discharging quantity.

In a preferred embodiment according to the present disclosure, the signal acquisition unit array is covered by a dielectric layer which is configured to be touched by a finger.

In a design solution of a chip, the signal acquisition module 1 and the signal processing module 2 are arranged in a same integrated circuit chip. In order to facilitate the modification and upgrade of a data processing program and the maintenance of the signal acquisition unit array, the signal acquisition module 1 and the signal processing module 2 may be arranged in different chips, i.e. the signal acquisition module 1 is arranged in a first integrated circuit chip and the signal processing module 2 is arranged in a second integrated circuit chip. In addition, in order to optimize performance of the signal acquisition unit array and adapt to a manufacturing condition of a mainstream process, as a preferred embodiment, the first integrated circuit chip arranged with the signal acquisition module 1 is made by a Thin Film Transistor fabrication process.

Figure 7:
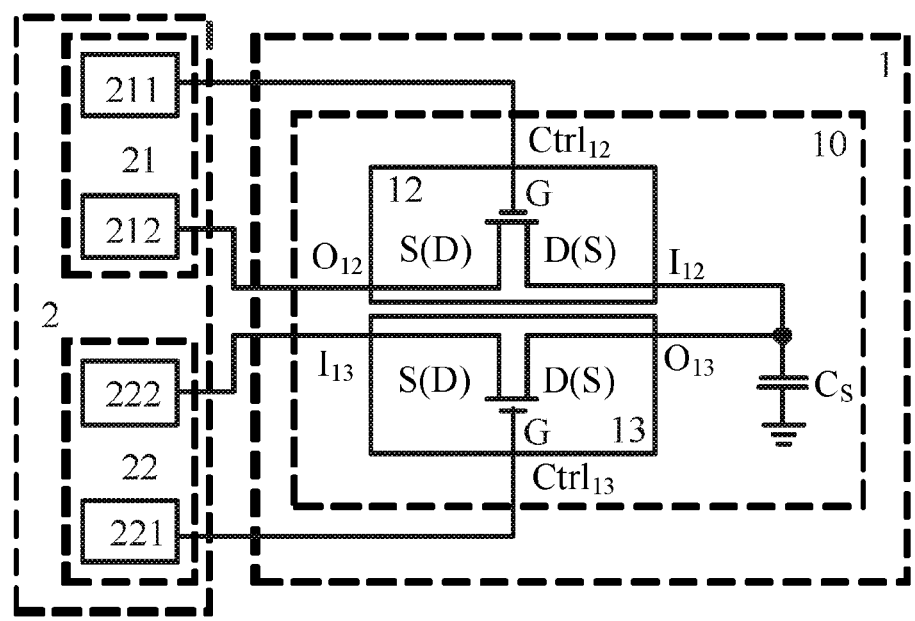
FIG. 7 is a schematic diagram of a basic electrical principle according to a preferred embodiment of the present disclosure.

A preferred embodiment according to the present disclosure is shown in FIG. 7. The measuring state signal processing unit 21 includes at least one acquisition processing sub-unit 212 and at least one acquisition driving sub-unit 211. The acquisition processing sub-unit 212 is configured to detect the capacitance change quantity of a branch where the sensing capacitor $C_S$ is located, and the acquisition driving sub-unit 211 is configured to control the sensing capacitor $C_S$ to be electrically connected to the acquisition processing sub-unit 212 or electrically disconnected from the acquisition processing sub-unit 212. The to-be-measured state signal processing unit 22 includes at least one electric potential servo sub-unit 222 and at least one to-be-measured driving sub-unit 221. The electric potential servo sub-unit 222 is configured to charge and discharge a branch where the sensing capacitor is located, and the to-be-measured driving sub-unit 221 is configured to control the sensing capacitor $C_S$ to be electrically connected to the electric potential servo sub-unit 222 or electrically disconnected from the electric potential servo sub-unit 222. For the signal acquisition unit 10 needing to operate in the measuring state, the acquisition driving sub-unit 211 controls the sensing capacitor $C_S$ of the signal acquisition unit 10 to be electrically connected to the acquisition processing sub-unit 212, and the acquisition processing sub-unit 212 detects the capacitance change quantities respectively caused by convex and concave textures of fingerprints in an electric field region formed by the sensing capacitor $C_S$. For the signal acquisition unit 10 needing to operate in the to-be-measured state, the to-be-measured driving sub-unit 221 controls the sensing capacitor $C_S$ to be electrically connected to the electric potential servo sub-unit 222, and an electric potential change of the sensing capacitor $C_S$ of the signal acquisition unit 10 in the to-be-measured state changes with an electric potential change of the sensing capacitor $C_S$ of the signal acquisition unit 10 in the measuring state.

In order to achieve the acquisition driving sub-unit 211 controlling the sensing capacitor $C_S$ to be electrically connected to the acquisition processing sub-unit 212 or electrically disconnected from the acquisition processing sub-unit 212, as shown in FIG. 7, the signal acquisition unit further includes a controlled acquisition switching sub-unit 12. An input end $I_{12}$ of the controlled acquisition switching sub-unit 12 is electrically connected to one end of the sensing capacitor $C_S$, and the other end of the sensing capacitor $C_S$ is grounded. An output end $O_{12}$ of the controlled acquisition switching sub-unit 12 outputs a signal to the acquisition processing sub-unit 212. A controlled end $Ctrl_{12}$ of the controlled acquisition switching sub-unit 12 is electrically connected to the acquisition driving sub-unit 211.

As shown in FIG. 7, the controlled acquisition switching sub-unit 12 is an insulated gate field effect transistor. A gate electrode G of the insulated gate field effect transistor serves as the controlled end $Ctrl_{12}$ of the controlled acquisition switching sub-unit 12. One of a drain electrode D of the insulated gate field effect transistor and a source electrode S of the insulated gate field effect transistor serves as the input end $I_{12}$ of the controlled acquisition switching sub-unit 12, and the other one of the drain electrode D of the insulated gate field effect transistor and the source electrode S of the insulated gate field effect transistor serves as the output end $O_{12}$ of the controlled acquisition switching sub-unit 12.

In order to achieve the to-be-measured driving sub-unit 221 controlling the sensing capacitor $C_S$ to be electrically connected to the electric potential servo sub-unit 222 or electrically disconnected from the electric potential servo sub-unit 222, as shown in FIG. 7, the signal acquisition unit 10 further includes a controlled to-be-measured switching sub-unit 13. An output end $O_{13}$ of the controlled to-be-measured switching sub-unit 13 is electrically connected to one end of the sensing capacitor $C_S$ and the other end of the sensing capacitor $C_S$ is grounded. An input end $I_{13}$ of the controlled to-be-measured switching sub-unit 13 receives a voltage signal outputted from the electric potential servo sub-unit 222. And a controlled end $Ctrl_{13}$ of the controlled to-be-measured switching sub-unit 13 is electrically connected to the to-be-measured driving sub-unit 221.

Similarly, as shown in FIG. 7, the controlled to-be-measured switching sub-unit 13 is an insulated gate field effect transistor. A gate electrode G of the insulated gate field effect transistor serves as the controlled end $Ctrl_{13}$ of the controlled to-be-measured switching sub-unit. One of a drain electrode D of the insulated gate field effect transistor and a source electrode S of the insulated gate field effect transistor serves as the input end $I_{13}$ of the controlled to-be-measured switching sub-unit 13, and the other one of the drain electrode D of the insulated gate field effect transistor and the source electrode S of the insulated gate field effect transistor serves as the output end $O_{13}$ of the controlled to-be-measured switching sub-unit 13.

Figure 8:
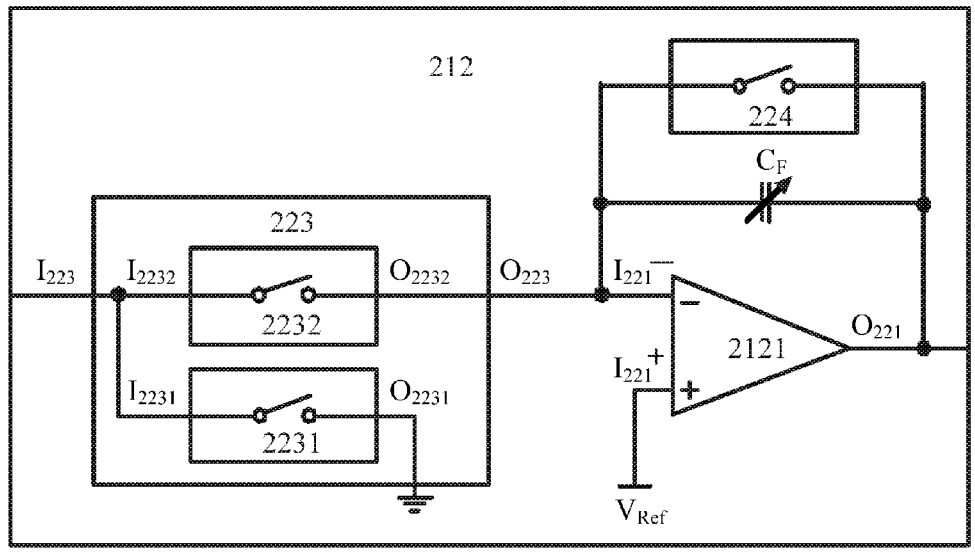
FIG. 8 is a schematic diagram of an electrical principle of a first implementation solution of an acquisition processing sub-unit 212 according to the present disclosure.
Figure 9:
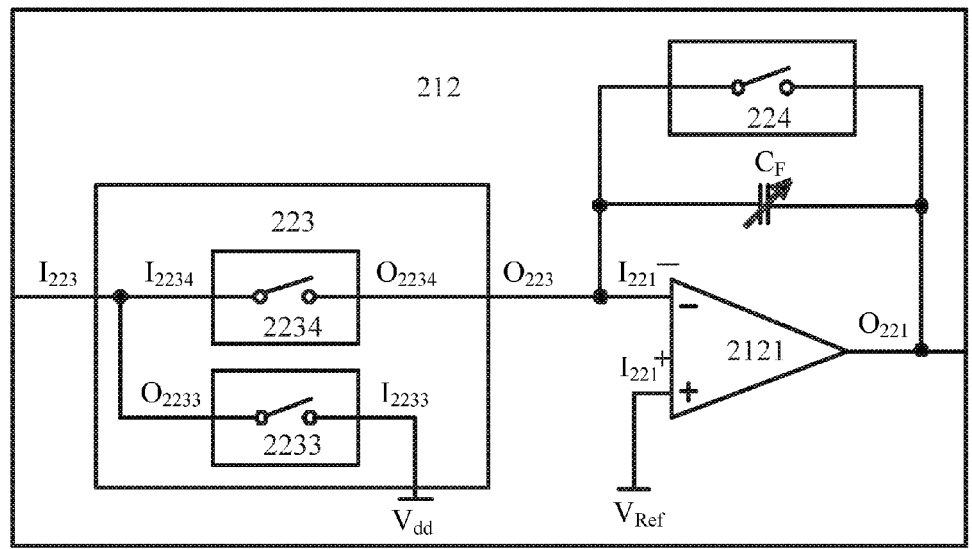
FIG. 9 is a schematic diagram of an electrical principle of a second implementation solution of an acquisition processing sub-unit 212 according to the present disclosure.
Figure 10:
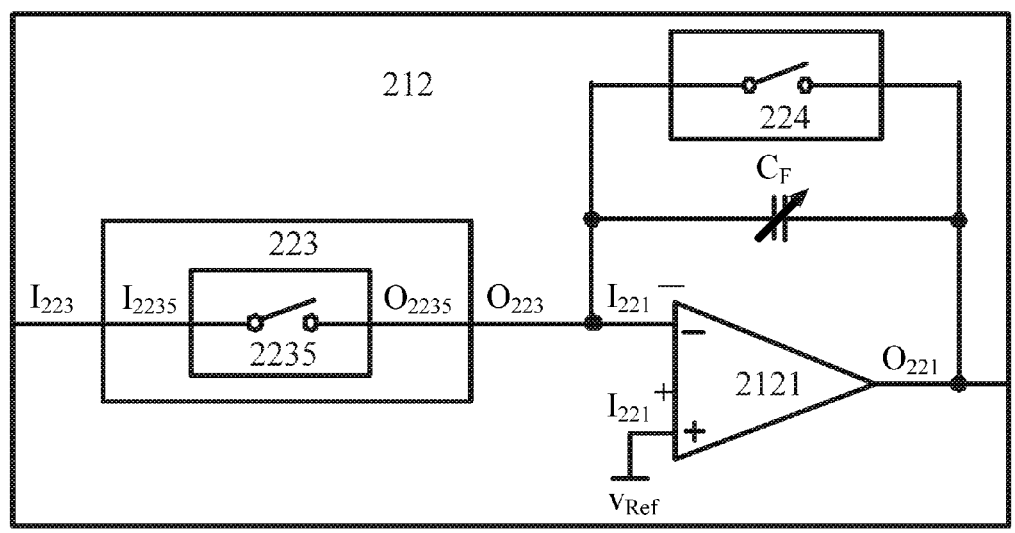
FIG. 10 is a schematic diagram of an electrical principle of a third implementation solution of an acquisition processing sub-unit 212 according to the present disclosure.

As shown in FIG. 8 to FIG. 10, the acquisition processing sub-unit 212 includes an operational amplifier 2121, a feedback capacitor $C_F$ and an analog switching circuit sub-unit 223. An output end $O_{223}$ of the analog switching circuit sub-unit 223 is electrically connected to an inverting input end of the operational amplifier 2121. Two ends of the feedback capacitor $C_F$ are electrically connected to the inverting input end and an output end of the operational amplifier 2121 respectively. A reference voltage is inputted to a non-inverting input end of the operational amplifier 2121. An input end $I_{223}$ of the analog switching circuit sub-unit 223 receives an output signal from the signal acquisition unit 10, such as an output signal of the controlled acquisition switching sub-unit 12 shown in FIG. 7. The output end $O_{221}$ of the operational amplifier 2121 outputs capacitance change quantities respectively caused by convex and concave textures of fingerprints in an electric field region formed by the sensing capacitor $C_S$ of the signal acquisition unit 10.

The present disclosure provides three implementation solutions for the analog switching circuit sub-unit 223 of the acquisition processing sub-unit 212.

A first implementation solution is as shown in FIG. 8. The analog switching circuit sub-unit 223 includes a predischarging analog switching circuit 2231 and a charging analog switching circuit 2232. A reference voltage $V_{Ref}$ having a constant voltage value is inputted to the non-inverting input end of the operational amplifier 2121. An input end $I_{2231}$ of the predischarging analog switching circuit 2231 is electrically connected to the input end $I_{223}$ of the analog switching circuit sub-unit 223, and an output end $O_{2231}$ of the predischarging analog switching circuit 2231 is grounded. An input end $I_{2232}$ of the charging analog switching circuit 2232 is electrically connected to the input end $I_{223}$ of the analog switching circuit sub-unit 223, and an output end $O_{2232}$ of the charging analog switching circuit 2232 is electrically connected to the output end $O_{223}$ of the analog switching circuit sub-unit 223. At the beginning of the acquisition processing sub-unit 212 detecting the capacitance change quantity, the input end $I_{2231}$ and output end $O_{2231}$ of the predischarging analog switching circuit 2231 are switched on while the input end $I_{2232}$ and output end $O_{2232}$ of the charging analog switching circuit 2232 are switched off, to complete a predischarging process of the sensing capacitor $C_S$. After the sensing capacitor $C_S$ is predischarged, the input end $I_{2232}$ and output end $O_{2232}$ of the charging analog switching circuit 2232 are switched on while the input end $I_{2231}$ and output end $O_{2231}$ of the predischarging analog switching circuit 2231 are switched off, to charge the sensing capacitor $C_S$. In this case, it is detected by means of the operational amplifier 2121 and the feedback capacitor $C_F$ the capacitance change quantities respectively caused by convex and concave textures of fingerprints during charging the sensing capacitor $C_S$.

A second implementation solution is as shown in FIG. 9. The analog switching circuit sub-unit 223 includes a precharging analog switching circuit 2233 and a discharging analog switching circuit 2234. A reference voltage $V_{Ref}$ having a constant voltage value is inputted to the non-inverting input end of the operational amplifier 2121. An output end $O_{2233}$ of the precharging analog switching circuit 2233 is electrically connected to the input end $I_{223}$ of the analog switching circuit sub-unit 233, and a charging voltage $V_{dd}$ is inputted to an input end $I_{2233}$ of the precharging analog switching circuit 2233. An input end $I_{2234}$ of the discharging analog switching circuit 2234 is electrically connected to the input end $I_{223}$ of the analog switching circuit sub-unit 223, and an output end $O_{2234}$ of the discharging analog switching circuit 2234 is electrically connected to the output end $O_{223}$ of the analog switching circuit sub-unit 223. At the beginning of the acquisition processing sub-unit 212 detecting the capacitance change quantity, the input end $I_{2233}$ and output end $O_{2233}$ of the precharging analog switching circuit 2233 are switched on while the input end $I_{2234}$ and output end $O_{2234}$ of the discharging analog switching circuit 2234 are switched off, to complete a precharging process of the sensing capacitor $C_S$. After the sensing capacitor $C_S$ is precharged, the input end $I_{2234}$ and output end $O_{2234}$ of the discharging analog switching circuit 2234 are switched on while the input end $I_{2233}$ and output end $O_{2233}$ of the precharging analog switching circuit 2233 are switched off, to discharge the sensing capacitor $C_S$. In this case, it is detected by means of the operational amplifier 2121 and the feedback capacitor $C_F$ the capacitance change quantities respectively caused by convex and concave textures of fingerprints during discharging the sensing capacitor $C_S$.

A third implementation solution is as shown in FIG. 10. The analog switching circuit sub-unit 223 includes an on-off control analog switching circuit 2235. A fluctuating reference voltage signal $v_{Ref}$ having a discharging cycle and a charging cycle is inputted to the non-inverting input end of the operational amplifier 2121. An input end $I_{2235}$ of the on-off control analog switching circuit 2235 is electrically connected to the input end $I_{223}$ of the analog switching circuit sub-unit 223, and an output end $O_{2235}$ of the on-off control analog switching circuit 2235 is electrically connected to the output end $O_{223}$ of the analog switching circuit sub-unit 223. In a case that the input end $I_{2235}$ and output end $O_{2235}$ of the on-off control analog switching circuit 2235 are switched on, a predischarging process of the sensing capacitor $C_S$ is completed in the discharging cycle of the fluctuating reference voltage signal $v_{Ref}$, and the sensing capacitor $C_S$ is charged in the charging cycle of the fluctuating reference voltage signal $v_{Ref}$. In this case, it is detected by means of the operational amplifier 2121 and the feedback capacitor $C_F$ the capacitance change quantities respectively caused by convex and concave textures of fingerprints during charging the sensing capacitor $C_S$.

As shown in FIG. 8 to FIG. 10, the feedback capacitor is an adjustable capacitor $C_F$ of which a capacitance value is adjustable. In this case, the feedback capacitor $C_F$ being the adjustable capacitor may compensate differences between channels and may be adapted to different external environments, such as a covered fingerprint of finger and different resolution requirements.

As shown in FIG. 8 to FIG. 10, the acquisition processing sub-unit 212 further includes a reset switching circuit 224 electrically connected to two ends of the feedback capacitor $C_F$. By switching on the reset switching circuit 224, a loop where the feedback capacitor $C_F$ is located is shorted out, thereby accelerating recovery of an electric charge amplifier. The electric charge amplifier includes the operational amplifier 221 and the feedback capacitor $C_F$ of the signal processing unit 22, and the sensing capacitor $C_S$ of the signal acquisition unit 10 electrically connected to the acquisition processing sub-unit 212.

A circuit of the electric potential servo sub-unit 222 may be designed with reference to the charging and discharging circuit of the above acquisition processing sub-unit 212. With the charging and discharging circuit adopted in the acquisition processing sub-unit 212, the charging and discharging processes of the sensing capacitor can be coordinated and controlled. A feedback capacitor may be further arranged between the electric potential servo sub-unit 222 and the acquisition processing sub-unit 212, thereby further ensuring the electric potential servo sub-unit 222 and the acquisition processing sub-unit 212 to synchronously charge and discharge sensing capacitors electrically connected to the electric potential servo sub-unit 222 and the acquisition processing sub-unit 212.

Based on the above electric field type fingerprint identification apparatus, the present disclosure provides a state control method in signal acquisition. The method includes the following steps:

A. in a case that the measuring state signal processing unit is electrically connected to at least one of the signal acquisition units and makes the at least one of the signal acquisition units be in the measuring state, at least electrically connecting the to-be-measured state signal processing unit to at least one of the signal acquisition units at the periphery of the signal acquisition unit in the measuring state and making the signal acquisition unit electrically connected to the to-be-measured state signal processing unit be in the to-be-measured state; and B. controlling charging and discharging processes of the sensing capacitor of the signal acquisition unit in the measuring state and controlling charging and discharging processes of the sensing capacitor of the signal acquisition unit in the to-be-measured state, to synchronize the charging and discharging processes of the sensing capacitor of the signal acquisition unit in the measuring state and the charging and discharging processes of the sensing capacitor of the signal acquisition unit in the to-be-measured state based on signals from branches where the sensing capacitors are located, to restrain the charging and discharging quantities of the parasitic capacitor between the sensing capacitor of the signal acquisition unit in the measuring state and the sensing capacitor of the signal acquisition unit in the to-be-measured state.

Figure 6:
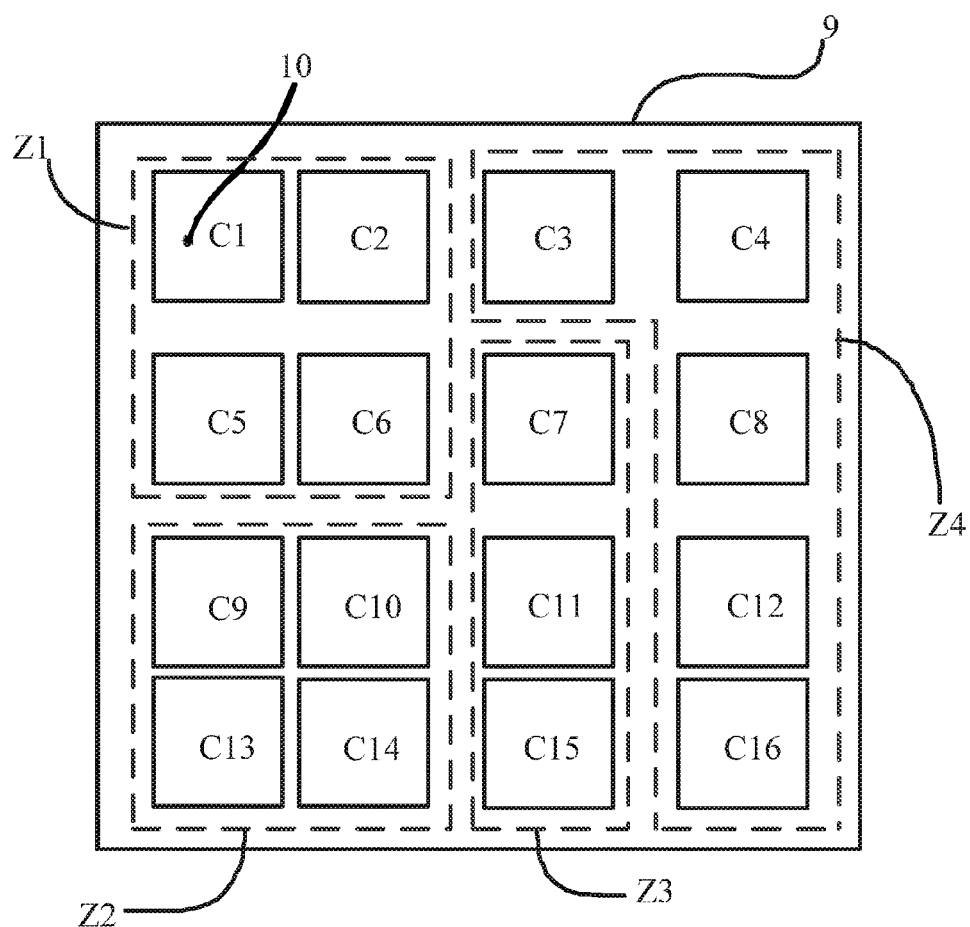
FIG. 6 is a schematic diagram of a scan region arrangement according to a preferred embodiment of the present disclosure.

In the present disclosure, several electrical connection cases of the to-be-measured state signal processing unit 22 are described in detail in conjunction with FIG. 2 to FIG. 5, where only one signal acquisition unit 10 is in the measuring state. However, in a preferred embodiment of the present disclosure, as shown in FIG. 6, a more useful solution is provided. In the provided solution, the signal acquisition units 10 are included in regions, and data of fingerprint information of different regions are acquired in different times. A process in which all of the regions are measured is one scan cycle and the region is defined as a scan region. Measurement of a capacitance change quantity completed for the scan regions is one time of scanning. In a preferred embodiment of the present disclosure, sixteen signal acquisition units 10 numbered C1 to C16 are arranged in the finger touch region 9. The finger touch region 9 is divided into four scan regions numbered Z1 to Z4, each of the scan regions includes multiple signal acquisition units 10. It can be understood from FIG. 6 that, the scan region may have a regular shape. For example, the scan region Z1 has a square shape formed by the signal acquisition units 10 numbered C1, C2, C5 and C6, the scan region Z2 has a square shape formed by the signal acquisition units 10 numbered C9, C10, C13 and C14, and the scan region Z3 has a rectangle shape formed by the signal acquisition units 10 numbered C7, C11 and C15. The scan region may have an irregular shape. For example, the scan region Z4 has a shape similar to an inverted "L" formed by the signal acquisition units 10 numbered C3, C4, C8, C12 and C16. In addition, the scan regions in a same finger touch region 9 may have a same shape or different shapes. It is assumed that a scan cycle is completed in an order of scan regions Z1, Z2, Z3 and Z4. In a case that the scan region Z1 is scanned, that is, the signal acquisition units 10 in the scan region Z1 are in the measuring state, in a case that it is determined that signal changes exist on branches where the sensing capacitors $C_S$ of the signal acquisition units 10 in the scan region Z1 are located, that is the fingerprint information exists in the scan region Z1, based on the signals from the branches where the sensing capacitors $C_S$ are located, a scan region at the periphery of the scan region Z1 should be set in the to-be-measured state. The scan region at the periphery of the scan region Z1 may be at least one of the scan regions Z2, Z3 and Z3. Alternatively, all of the other scan regions i.e. the scan regions Z2, Z3 and Z4 other than the scan region Z1 should be set in the to-be-measured state. The scan region at the periphery of the scan region where the fingerprint information exists does not always include all of the other scan regions other than the scan region where the fingerprint information exists. For example, in a case that the scan region Z4 is scanned and the signal acquisition units in the scan region Z4 are in the measuring state, in a case that it is determined that signal changes exist on branches where the sensing capacitors $C_S$ of the signal acquisition units 10 in the scan region Z4 are located, that is the fingerprint information exists in the scan region Z4, based on the signals from the branches where the sensing capacitors $C_S$ are located, a scan region at the periphery of the scan region Z4 should be set in the to-be-measured state. The scan region at the periphery of the scan region Z4 is at least one of the scan regions Z1 and Z3. Of course, all of other scan regions, i.e. the scan regions Z1, Z2 and Z3 other than the scan region Z4, may be set in the to-be-measured state. In a case that the fingerprint information is detected, the scan region in a scanning state is set to the measuring state, and the scan region in a non-scanning state is set to the to-be-measured state, thereby effectively preventing the signal acquisition unit in the scan region in the to-be-measured state from affecting the signal acquisition unit in the scan region in the measuring state, and ensuring accuracy of fingerprint information acquisition.

The signal from the branch where the sensing capacitor is located according to step B refers to at least one of frequency, voltage amplitude, current amplitude, phase and electric charge on the branch where the sensing capacitor is located.

The controlled acquisition switching sub-unit 12 may be connected to the acquisition driving sub-unit 211 and the acquisition processing sub-unit 212, and the controlled to-be-measured switching sub-unit 13 may be connected to the to-be measured driving sub-unit 221 and the electric potential servo sub-unit 222, in a combined manner of the following connection cases.

For control signal acquisition of the controlled acquisition switching sub-unit 12, the controlled ends $Ctrl_{12}$ of the controlled acquisition switching sub-units 12 may be electrically connected to the acquisition driving sub-unit 211 independently. Alternatively, the controlled ends $Ctrl_{12}$ of the controlled acquisition switching sub-units 12 are electrically connected to at least two acquisition driving nodes in a grouped way, and the acquisition driving nodes are electrically connected to the acquisition driving sub-unit 211 independently. Alternatively, the controlled ends $Ctrl_{12}$ of the controlled acquisition switching sub-units 12 are all electrically connected to an acquisition driving node, and the acquisition driving node is electrically connected to the acquisition driving sub-unit 211.

For an output signal of the controlled acquisition switching sub-unit 12, the output ends $O_{12}$ of the controlled acquisition switching sub-units 12 may output signals to the acquisition processing sub-unit 212 independently. Alternatively, the output ends $O_{12}$ of the controlled acquisition switching sub-units 12 are electrically connected to at least two signal acquisition nodes in a grouped way, and the signal acquisition nodes output signals to the acquisition processing sub-unit 212 independently. Alternatively, the output ends $O_{12}$ of the controlled acquisition switching sub-units 12 are electrically connected to a signal acquisition node in a grouped way, and the signal acquisition node outputs a signal to the acquisition processing sub-unit 212.

Similarly, for a control signal of the controlled to-be-measured switching sub-unit 13, the controlled ends $Ctrl_{13}$ of the controlled to-be-measured switching sub-units 13 may be electrically connected to the to-be-measured driving sub-unit 221 independently. Alternatively, the control ends $Ctrl_{13}$ of the controlled to-be-measured switching sub-units 13 are electrically connected to at least two servo driving nodes in a grouped way, and the servo driving nodes are electrically connected to the to-be-measured driving sub-unit 221 independently. Alternatively, the controlled ends $Ctrl_{13}$ of the controlled constant voltage switching sub-units 13 are all electrically connected to a servo driving node, and the servo driving node is electrically connected to the to-be-measured driving sub-unit 221.

For an input signal of the controlled to-be-measured switching sub-unit 13, the input ends $I_{13}$ of the controlled to-be-measured switching sub-units 13 may independently receive the voltage signal outputted from the electric potential servo sub-unit 222. Alternatively, the input ends $I_{13}$ of the controlled to-be-measured switching sub-units 13 are electrically connected to at least two servo input nodes in a grouped way, and the servo input nodes independently receives the voltage signal outputted from the electric potential servo sub-unit 222. Alternatively, the input ends $I_{13}$ of the controlled to-be-measured switching sub-units 13 are all electrically connected to a servo input node, and the servo input node receives the voltage signal outputted from the electric potential servo sub-unit 222.

In a fingerprint identification apparatus, according to an application requirement, one solution may be selected from each of the above four groups of solutions and units of the entire fingerprint identification apparatus may be electrically connected with the selected four solutions. It can be seen that there are a large number of connection solutions for electrically connecting the respective units according to the present disclosure.

Figure 11:
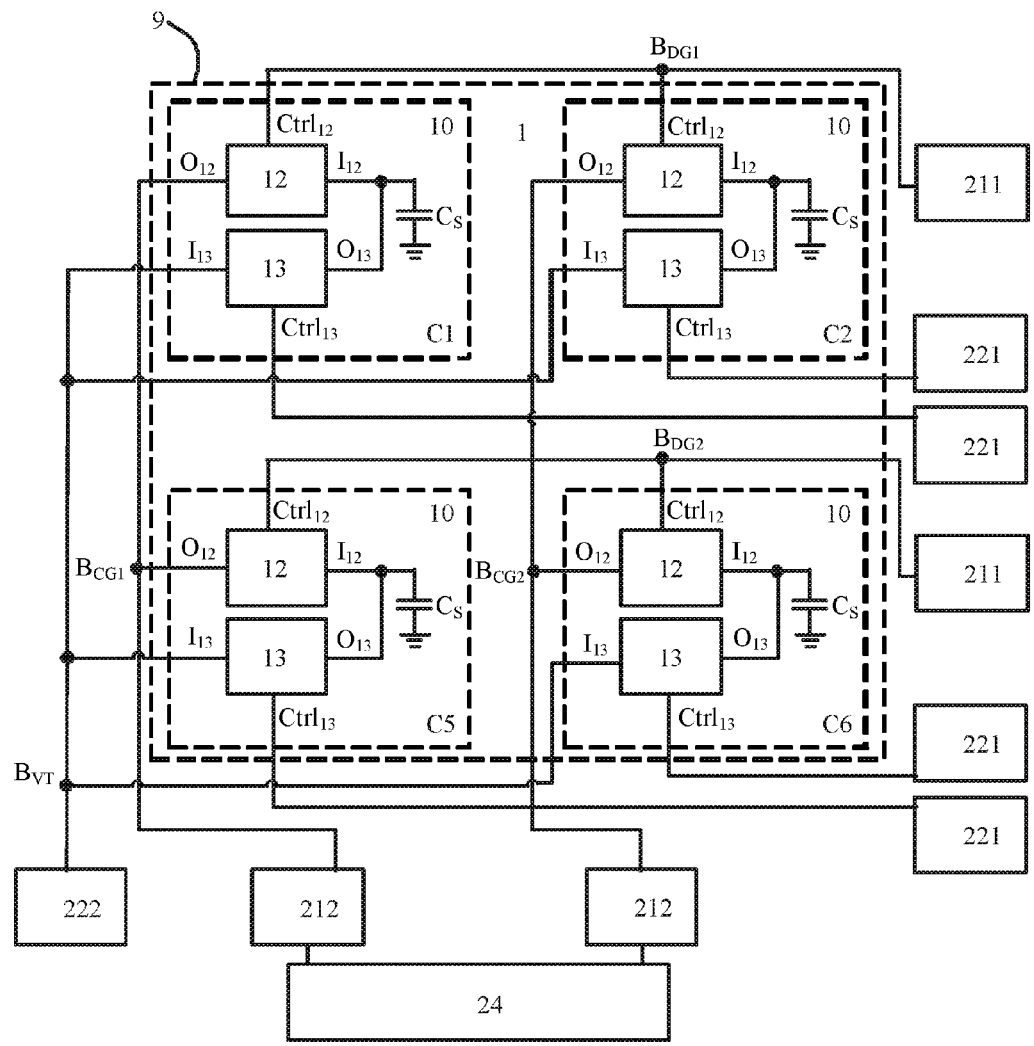
FIG. 11 is a schematic diagram of an electrical principle of scan regions Z1 and Z2 according to a preferred embodiment of the present disclosure.

In a preferred embodiment according to the present disclosure, examples of the above four groups of solutions are described by taking the signal acquisition units 10 in the scan region Z1 as an example. As shown in FIG. 11, for the control signal acquisition of the controlled acquisition switching sub-unit 12, the controlled ends $Ctrl_{12}$ of the controlled acquisition switching sub-units 12 are electrically connected to two acquisition driving nodes $B_{DG1}$ and $B_{DG2}$ in a grouped way, and the acquisition driving nodes $B_{DG1}$ and $B_{DG2}$ are electrically connected to the acquisition driving sub-units 211 independently. In the preferred embodiment, a one-to-one correspondence exists between the acquisition driving sub-units 211 and the acquisition driving nodes $B_{DG1}$ and $B_{DG2}$. And of course, it is feasible to electrically connect the two acquisition driving nodes $B_{DG1}$ and $B_{DG2}$ to different input ports of one acquisition driving sub-unit 211 respectively. For the output signal of the controlled acquisition switching sub-unit 12, the output ends $O_{12}$ of the controlled acquisition switching sub-units 12 are electrically connected to two signal acquisition nodes $B_{CG1}$ and $B_{CG2}$ in a grouped way, and the signal acquisition nodes $B_{CG1}$ and $B_{CG2}$ output signals to the acquisition processing sub-units 212 independently. In the preferred embodiment, a one-to-one correspondence exists between the acquisition processing sub-units 212 and the signal acquisition nodes $B_{CG1}$ and $B_{CG2}$. And of course, it is feasible to electrically connect the two signal acquisition nodes $B_{CG1}$ and $B_{CG2}$ to different input ports of one acquisition processing sub-unit 212 respectively. For the control signal of the controlled to-be-measured switching sub-unit 13, the controlled ends $Ctrl_{13}$ of the controlled to-be-measured switching sub-units 13 are electrically connected to the to-be-measured driving sub-units 221 independently. In the preferred embodiment, a one-to-one correspondence exists between the to-be-measured driving sub-units 221 and the control ends $Ctrl_{13}$ of the controlled to-be-measured switching sub-units 13. And of course, it is feasible to electrically connect the controlled ends $Ctrl_{13}$ of the controlled to-be-measured switching sub-units 13 to four different input ports of one to-be-measured driving sub-unit 221 respectively. For the input signal of the controlled to-be-measured switching sub-unit 13, the input ends $I_{13}$ of all of the controlled constant voltage switching sub-units 13 are electrically connected to a servo input node $B_{VT}$, and the servo input node $B_{VT}$ receives a voltage signal outputted from the electric potential servo sub-unit 222. Therefore, it is feasible to choose any one of the connection solutions as long as a basic requirement of the present disclosure can be achieved. The basic requirement is "for the signal acquisition unit 10 needing to operate in the measuring state, the acquisition driving sub-unit 211 controls the sensing capacitor $C_S$ of the signal acquisition unit 10 to be electrically connected to the acquisition processing sub-unit 212, and the acquisition processing sub-unit 212 detects the capacitance change quantities respectively caused by convex and concave textures of fingerprints in an electric field region formed by the sensing capacitor $C_S$; for the signal acquisition unit 10 needing to operate in the to-be-measured state, the to-be-measured driving sub-unit 221 controls the sensing capacitor $C_S$ to be electrically connected to the electric potential servo sub-unit 222, and an electric potential change of the sensing capacitor $C_S$ of the signal acquisition unit 10 in the to-be-measured state changes with an electric potential change of the sensing capacitor $C_S$ of the signal acquisition unit 10 in the measuring state".

It is apparent that, in all of the solutions, a device cost can be saved and a scan frequency may be reduced in a case that a solution with few acquisition driving sub-units 211, few acquisition processing sub-units 212, few to-be-measured driving sub-units 221 and few electric potential servo sub-units 222 is selected. And the scan frequency can be improved although more devices need to be configured in a case that a solution with more acquisition driving sub-units 211, more acquisition processing sub-units 212, more to-be-measured driving sub-units 221 and more electric potential servo sub-units 222 is selected.

In an aspect of digitalized data processing, the signal processing module 2 further includes at least one analog-digital conversion unit 24 electrically connected to all of the acquisition processing sub-units 212. In a preferred embodiment according to the present disclosure, as shown in FIG. 11, the analog-digital conversion unit 24 is arranged in the signal processing module 2. The analog-digital conversion unit 24 is electrically connected to the two acquisition processing units 212. And of course, it is feasible to arrange an analog-digital conversion unit 24 for each of the acquisition processing sub-units 212.

Figure 12:
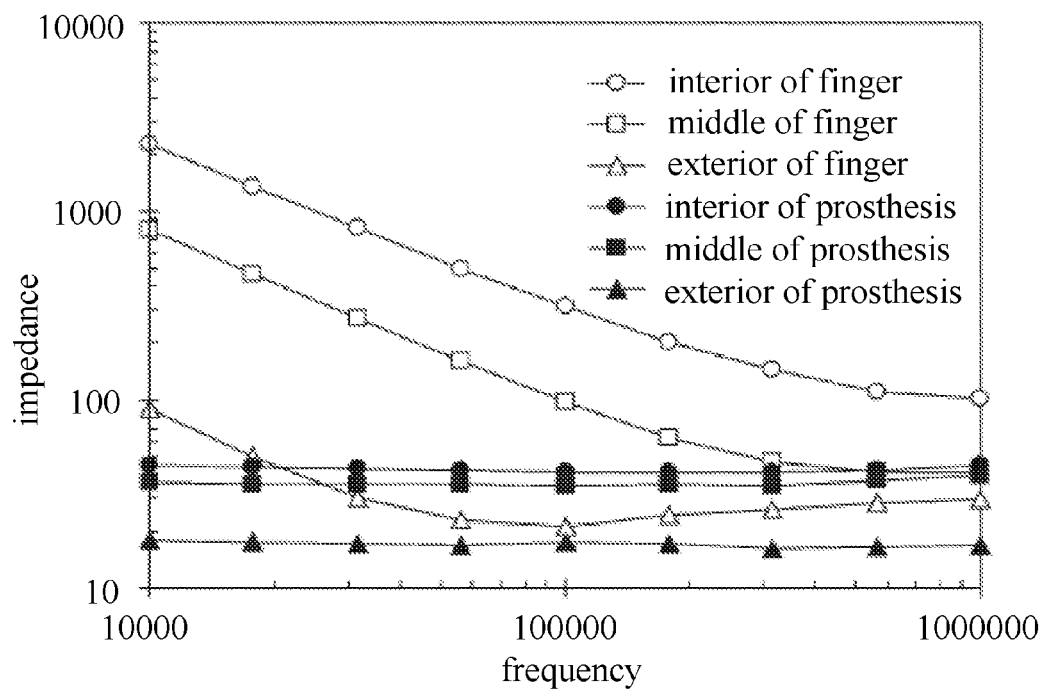
FIG. 12 is a schematic diagram of relationships between scan frequencies and impedances of a real finger and relationships between scan frequencies and impedances of a prosthesis finger.
Figure 13:
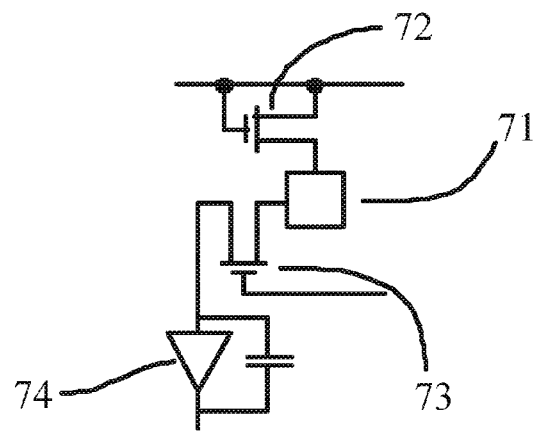
FIG. 13 is a schematic diagram of an electrical principle of a basic unit of a fingerprint identification apparatus according to the conventional technology.

Based on the experimental data shown in FIG. 12, for issues, for example, various fake fingerprints are used to cheat a fingerprint identification system and a surface of the skin of a finger is easily soiled and destroyed, in the present disclosure, features of interior of the skin of finger may be detected by using different scan frequencies based on different electrical features of a stratum corneum and a viable skin of a real finger. In other words, as shown in FIG. 9, impedance of a stratum corneum of a fingerprint of a prosthesis finger changes much less than the viable skin of a fingerprint of a real finger under different frequencies. In this case, information of the interior of the skin of finger may be obtained to determine a fingerprint of a prosthesis finger. The present disclosure provides a method for identifying a fingerprint of a prosthesis finger, which is applied in the electric field type fingerprint identification apparatus based on a self-capacitance principle. The method includes the following steps:

A. providing an impedance change threshold and completing step B to step E before performing fingerprint identification;

B. detecting an impedance change value of a detected finger with different scan frequencies in a descending order or an ascending order of the scan frequencies;

C. comparing the impedance change value detected in step B with the impedance change threshold;

if the impedance change value detected in step B is not less than the impedance change threshold, performing step D;

if the impedance change value detected in step B is less than the impedance change threshold, performing step E;

D. determining that the detected finger is a real finger and starting to perform the fingerprint identification; or E. determining that the detected finger is a prosthesis finger and terminating the fingerprint identification.

The invention claimed is:

1. An electric field type fingerprint identification apparatus comprising a signal acquisition module and a signal processing module; wherein, the signal acquisition module comprises at least two signal acquisition units, all of the signal acquisition units fill up an entire finger touch region and form a signal acquisition unit array, and each of the signal acquisition units comprises a sensing capacitor;

the signal processing module comprises a measuring state signal processing unit and a to-be-measured state signal processing unit, the measuring state signal processing unit is configured to acquire capacitance change quantities respectively caused by convex and concave textures of fingerprints from the signal acquisition unit by charging and discharging the sensing capacitor, the to-be-measured state signal processing unit is configured to only charge and discharge the sensing capacitor of the signal acquisition unit, and the measuring state signal processing unit and the to-be measured state signal processing unit are electrically connected to the signal acquisition units controlledly; and in a case that the measuring state signal processing unit is electrically connected to at least one of the signal acquisition units and makes the at least one of the signal acquisition units be in a measuring state, the to-be-measured state signal processing unit is at least electrically connected to at least one of the signal acquisition units at the periphery of the signal acquisition unit in the measuring state and makes the at least one of the signal acquisition units be in a to-be-measured state, and charging and discharging quantities of a parasitic capacitor between the signal acquisition unit in the measuring state and the signal acquisition unit in the to-be-measured state are restrained by controlling the measuring state signal processing unit and the to-be-measured state signal processing unit to coordinate charging and discharging processes of the sensing capacitors electrically connected to the measuring state signal processing unit and the to-be-measured state signal processing unit.

2. The electric field type fingerprint identification apparatus according to claim 1, wherein the signal acquisition unit array is covered by a dielectric layer which is configured to be touched by a finger.

3. The electric field type fingerprint identification apparatus according to claim 1, wherein the signal acquisition module and the signal processing module are arranged in a same integrated circuit chip.

4. The electric field type fingerprint identification apparatus according to claim 1, wherein the signal acquisition module is arranged in a first integrated circuit chip and the signal processing module is arranged in a second integrated circuit chip.

5. The electric field type fingerprint identification apparatus according to claim 4, wherein the first integrated circuit chip arranged with the signal acquisition module is made by a Thin Film Transistor fabrication process.

6. The electric field type fingerprint identification apparatus according to claim 1, wherein,
the measuring state signal processing unit comprises at least one acquisition processing sub-unit and at least one acquisition driving sub-unit, the acquisition processing sub-unit is configured to detect the capacitance change quantity of a branch where the sensing capacitor is located, and the acquisition driving sub-unit is configured to control the sensing capacitor to be electrically connected to the acquisition processing sub-unit or electrically disconnected from the acquisition processing sub-unit;
the to-be-measured state signal processing unit comprises at least one electric potential servo sub-unit and at least one to-be-measured driving sub-unit, the electric potential servo sub-unit is configured to charge and discharge a branch where the sensing capacitor is located, and the to-be-measured driving sub-unit is configured to control the sensing capacitor to be electrically connected to the electric potential servo sub-unit or electrically disconnected from the electric potential servo sub-unit; and
for the signal acquisition unit needing to operate in the measuring state, the acquisition driving sub-unit controls the sensing capacitor of the signal acquisition unit to be electrically connected to the acquisition processing sub-unit, and the acquisition processing sub-unit detects the capacitance change quantities respectively caused by convex and concave textures of fingerprints in an electric field region formed by the sensing capacitor; for the signal acquisition unit needing to operate in the to-be-measured state, the to-be-measured driving sub-unit controls the sensing capacitor to be electrically connected to the electric potential servo sub-unit, and an electric potential change of the sensing capacitor of the signal acquisition unit in the to-be-measured state changes with an electric potential change of the sensing capacitor of the signal acquisition unit in the measuring state.

7. The electric field type fingerprint identification apparatus according to claim 6, wherein,
the signal acquisition unit further comprises a controlled acquisition switching sub-unit; and
an input end of the controlled acquisition switching sub-unit is electrically connected to one end of the sensing capacitor and the other end of the sensing capacitor is grounded, an output end of the controlled acquisition switching sub-unit outputs a signal to the acquisition processing sub-unit, and a controlled end of the controlled acquisition switching sub-unit is electrically connected to the acquisition driving sub-unit.

8. The electric field type fingerprint identification apparatus according to claim 7, wherein,
the controlled acquisition switching sub-unit is an insulated gate field effect transistor;
a gate electrode of the insulated gate field effect transistor serves as the controlled end of the controlled acquisition switching sub-unit; and
one of a drain electrode of the insulated gate field effect transistor and a source electrode of the insulated gate field effect transistor serves as the input end of the controlled acquisition switching sub-unit, and the other one of the drain electrode of the insulated gate field effect transistor and the source electrode of the insulated gate field effect transistor serves as the output end of the controlled acquisition switching sub-unit.

9. The electric field type fingerprint identification apparatus according to claim 6, wherein,
the signal acquisition unit further comprises a controlled to-be-measured switching sub-unit; and
an output end of the controlled to-be-measured switching sub-unit is electrically connected to one end of the sensing capacitor, and the other end of the sensing capacitor is grounded, an input end of the controlled to-be-measured switching sub-unit receives a voltage signal outputted from the electric potential servo sub-unit, and a controlled end of the controlled to-be-measured switching sub-unit is electrically connected to the to-be-measured driving sub-unit.

10. The electric field type fingerprint identification apparatus according to claim 9, wherein,
the controlled to-be-measured switching sub-unit is an insulated gate field effect transistor;
a gate electrode of the insulated gate field effect transistor serves as the controlled end of the controlled to-be-measured switching sub-unit; and
one of a drain electrode of the insulated gate field effect transistor and a source electrode of the insulated gate field effect transistor serves as the input end of the controlled to-be-measured switching sub-unit, and the other one of the drain electrode of the insulated gate field effect transistor and the source electrode of the insulated gate field effect transistor serves as the output end of the controlled to-be-measured switching sub-unit.

11. The electric field type fingerprint identification apparatus according to claim 6, wherein, the acquisition processing sub-unit comprises an operational amplifier, a feedback capacitor and an analog switching circuit sub-unit;

an output end of the analog switching circuit sub-unit is electrically connected to an inverting input end of the operational amplifier, two ends of the feedback capacitor are electrically connected to the inverting input end and an output end of the operational amplifier respectively, and a reference voltage is inputted to a non-inverting input end of the operational amplifier; and an input end of the analog switching circuit sub-unit receives an output signal from the signal acquisition unit, and the output end of the operational amplifier outputs a quantized signal of the capacitance change quantities respectively caused by convex and concave textures of fingerprints in an electric field region formed by the sensing capacitor of the signal acquisition unit.

12. The electric field type fingerprint identification apparatus according to claim 11, wherein, the analog switching circuit sub-unit comprises a predischarging analog switching circuit and a charging analog switching circuit, and a reference voltage having a constant voltage value is inputted to the non-inverting input end of the operational amplifier;

an input end of the predischarging analog switching circuit is electrically connected to the input end of the analog switching circuit sub-unit, and an output end of the predischarging analog switching circuit is grounded;

an input end of the charging analog switching circuit is electrically connected to the input end of the analog switching circuit sub-unit, and an output end of the charging analog switching circuit is electrically connected to the output end of the analog switching circuit sub-unit; and at the beginning of the acquisition processing sub-unit detecting the capacitance change quantity, the input end of the predischarging analog switching circuit and the output end of the predischarging analog switching circuit are switched on while the input end of the charging analog switching circuit and the output end of the charging analog switching circuit are switched off to complete a predischarging process of the sensing capacitor; after the sensing capacitor is predischarged, the input end of the charging analog switching circuit and the output end of the charging analog switching circuit are switched on while the input end of the predischarging analog switching circuit and the output end of the predischarging analog switching circuit are switched off to charge the sensing capacitor, and it is detected by means of the operational amplifier and the feedback capacitor the capacitance change quantities respectively caused by convex and concave textures of fingerprints during charging the sensing capacitor.

13. The electric field type fingerprint identification apparatus according to claim 11, wherein, the analog switching circuit sub-unit comprises a precharging analog switching circuit and a discharging analog switching circuit, and a reference voltage having a constant voltage value is inputted to the non-inverting input end of the operational amplifier;

an output end of the precharging analog switching circuit is electrically connected to the input end of the analog switching circuit sub-unit and a charging voltage is inputted to an input end of the precharging analog switching circuit;

an input end of the discharging analog switching circuit is electrically connected to the input end of the analog switching circuit sub-unit and an output end of the discharging analog switching circuit is electrically connected to the output end of the analog switching circuit sub-unit; and at the beginning of the acquisition processing sub-unit detecting the capacitance change quantity, the input end of the precharging analog switching circuit and the output end of the precharging analog switching circuit are switched on while the input end of the discharging analog switching circuit and the output end of the discharging analog switching circuit are switched off to complete a precharging process of the sensing capacitor; after the sensing capacitor is precharged, the input end of the discharging analog switching circuit and the output end of the discharging analog switching circuit are switched on while the input end of the precharging analog switching circuit and the output end of the precharging analog switching circuit are switched off to discharge the sensing capacitor, and it is detected by means of the operational amplifier and the feedback capacitor the capacitance change quantities respectively caused by convex and concave textures of fingerprints during discharging the sensing capacitor.

14. The electric field type fingerprint identification apparatus according to claim 11, wherein, the analog switching circuit sub-unit comprises an on-off control analog switching circuit, and a fluctuating reference voltage signal having a discharging circle and a charging circle is inputted to the non-inverting input end of the operational amplifier;

an input end of the on-off control analog switching circuit is electrically connected to the input end of the analog switching circuit sub-unit, and an output end of the on-off control analog switching circuit is electrically connected to the output end of the analog switching circuit sub-unit; and in a case that the input end and output end of the on-off control analog switching circuit are switched on, a predischarging process of the sensing capacitor is completed in the discharging circle of the fluctuating reference voltage signal, the sensing capacitor is charged in the charging circle of the fluctuating reference voltage signal, and it is detected by means of the operational amplifier and the feedback capacitor the capacitance change quantities respectively caused by convex and concave textures of fingerprints during charging the sensing capacitor.

15. The electric field type fingerprint identification apparatus according to claim 11, wherein the feedback capacitor is an adjustable capacitor of which a capacitance value is adjustable.

16. The electric field type fingerprint identification apparatus according to claim 11, wherein, the acquisition processing sub-unit further comprises a reset switching circuit electrically connected to two ends of the feedback capacitor, by switching on the reset switching circuit, a loop where the feedback capacitor is located is shorted out and recovery of an electric charge amplifier is accelerated; and the electric charge amplifier comprises the operational amplifier and the feedback capacitor of the acquisition processing sub-unit, and the sensing capacitor of the signal acquisition unit electrically connected to the acquisition processing sub-unit.

17. The electric field type fingerprint identification apparatus according to claim 6, wherein the measuring state signal processing unit further comprises at least one analog-digital conversion sub-unit electrically connected to all of the at least one acquisition processing sub-unit.

18. The electric field type fingerprint identification apparatus according to claim 7, wherein the controlled ends of the controlled acquisition switching sub-units are electrically connected to the acquisition driving sub-unit independently.

19. The electric field type fingerprint identification apparatus according to claim 7, wherein the controlled ends of the controlled acquisition switching sub-units are electrically connected to at least two acquisition driving nodes in a grouped way, and the acquisition driving nodes are electrically connected to the acquisition driving sub-unit independently.

20. The electric field type fingerprint identification apparatus according to claim 7, wherein the controlled ends of the controlled acquisition switching sub-units are all electrically connected to an acquisition driving node, and the acquisition driving node is electrically connected to the acquisition driving sub-unit.

21. The electric field type fingerprint identification apparatus according to claim 7, wherein the output ends of the controlled acquisition switching sub-units output signals to the acquisition processing sub-unit independently.

22. The electric field type fingerprint identification apparatus according to claim 7, wherein the output ends of the controlled acquisition switching sub-units are electrically connected to at least two signal acquisition nodes in a grouped way, and the signal acquisition nodes output signals to the acquisition processing sub-unit independently.

23. The electric field type fingerprint identification apparatus according to claim 7, wherein the output ends of the controlled acquisition switching sub-units are electrically connected to a signal acquisition node in a grouped way, and the signal acquisition node outputs a signal to the acquisition processing sub-unit.

24. The electric field type fingerprint identification apparatus according to claim 9, wherein the controlled ends of the controlled to-be-measured switching sub-units are electrically connected to the to-be-measured driving sub-unit independently.

25. The electric field type fingerprint identification apparatus according to claim 9, wherein the controlled ends of the controlled to-be-measured switching sub-units are electrically connected to at least two servo driving nodes in a grouped way, and the servo driving nodes are electrically connected to the to-be-measured driving sub-unit independently.

26. The electric field type fingerprint identification apparatus according to claim 9, wherein the controlled ends of the controlled to-be-measured switching sub-units are all electrically connected to a servo driving node, and the servo driving node is electrically connected to the to-be-measured driving sub-unit.

27. The electric field type fingerprint identification apparatus according to claim 9, wherein the input ends of the controlled to-be-measured switching sub-units independently receive the voltage signal outputted from the electric potential servo sub-unit.

28. The electric field type fingerprint identification apparatus according to claim 9, wherein the input ends of the controlled to-be-measured switching sub-units are electrically connected to at least two servo input nodes in a grouped way, and the servo input nodes independently receive the voltage signal outputted from the electric potential servo sub-unit.

29. The electric field type fingerprint identification apparatus according to claim 9, wherein the input ends of the controlled to-be-measured switching sub-units are all electrically connected to a servo input node, and the servo input node receives the voltage signal outputted from the electric potential servo sub-unit.

30. A state control method in signal acquisition applied in an electric field type fingerprint identification apparatus, wherein
the electric field type fingerprint identification apparatus comprises a signal acquisition module and a signal processing module;
the signal acquisition module comprises at least two signal acquisition units, all of the signal acquisition units fill up an entire finger touch region and form a signal acquisition unit array, and each of the signal acquisition units comprises a sensing capacitor;
the signal processing module comprises a measuring state signal processing unit and a to-be-measured state signal processing unit, the measuring state signal processing unit is configured to acquire capacitance change quantities respectively caused by convex and concave textures of fingerprints from the signal acquisition unit by charging and discharging the sensing capacitor, the to-be-measured state signal processing unit is configured to only charge and discharge the sensing capacitor of the signal acquisition unit, and the measuring state signal processing unit and the to-be measured state signal processing unit are electrically connected to the signal acquisition units controlledly, and
the state control method comprises the following steps:
A. in a case that the measuring state signal processing unit is electrically connected to at least one of the signal acquisition units and makes the at least one of the signal acquisition units be in a measuring state, at least electrically connecting the to-be-measured state signal processing unit to at least one of the signal acquisition units at the periphery of the signal acquisition unit in the measuring state and making the signal acquisition unit electrically connected to the to-be-measured state signal processing unit be in a to-be-measured state; and
B. controlling charging and discharging processes of the sensing capacitor of the signal acquisition unit in the measuring state and controlling charging and discharging processes of the sensing capacitor of the signal acquisition unit in the to-be-measured state, to synchronize the charging and discharging processes of the sensing capacitor of the signal acquisition unit in the measuring state and the charging and discharging processes of the sensing capacitor of the signal acquisition unit in the to-be-measured state based on signals from branches where the sensing capacitors are located, to restrain the charging and discharging quantities of a parasitic capacitor between the sensing capacitor of the signal acquisition unit in the measuring state and the sensing capacitor of the signal acquisition unit in the to-be-measured state.

31. The state control method in signal acquisition according to claim 30, wherein the signal from the branch where the sensing capacitor is located according to step B refers to at least one of frequency, voltage amplitude, current amplitude, phase and electric charge on the branch where the sensing capacitor is located.

32. A method for identifying a fingerprint of a prosthesis finger applied in an electric field type fingerprint identification apparatus based on a self-capacitance principle, wherein the electric field type fingerprint identification apparatus comprises a signal acquisition module and a signal processing module;

the signal acquisition module comprises at least two signal acquisition units, all of the signal acquisition units fill up an entire finger touch region and form a signal acquisition unit array, and each of the signal acquisition units comprises a sensing capacitor;

the signal processing module comprises a measuring state signal processing unit and a to-be-measured state signal processing unit, the measuring state signal processing unit is configured to acquire capacitance change quantities respectively caused by convex and concave textures of fingerprints from the signal acquisition unit by charging and discharging the sensing capacitor, the to-be-measured state signal processing unit is configured to only charge and discharge the sensing capacitor of the signal acquisition unit, and the measuring state signal processing unit and the to-be measured state signal processing unit are electrically connected to the signal acquisition units controlledly; and in a case that the measuring state signal processing unit is electrically connected to at least one of the signal acquisition units and makes the at least one of the signal acquisition units be in a measuring state, the to-be-measured state signal processing unit is at least electrically connected to at least one of the signal acquisition units at the periphery of the signal acquisition unit in the measuring state and makes the at least one of the signal acquisition units be in a to-be-measured state, and charging and discharging quantities of a parasitic capacitor between the signal acquisition unit in the measuring state and the signal acquisition unit in the to-be-measured state are restrained by controlling the measuring state signal processing unit and the to-be-measured state signal processing unit to coordinate charging and discharging processes of the sensing capacitors electrically connected to the measuring state signal processing unit and the to-be-measured state signal processing unit, the method for identifying the fingerprint of the prosthesis finger comprises the following steps:

A. providing an impedance change threshold and completing step B to step E before performing fingerprint identification;

B. detecting an impedance change value of a detected finger with different scan frequencies in a descending order or an ascending order of the scan frequencies;

C. comparing the impedance change value detected in step B with the impedance change threshold;

if the impedance change value detected in step B is not less than the impedance change threshold, performing step D;

if the impedance change value detected in step B is less than the impedance change threshold, performing step E;

D. determining that the detected finger is a real finger and starting to perform the fingerprint identification; or E. determining that the detected finger is a prosthesis finger and terminating the fingerprint identification.

* * * * *